(12) United States Patent  
Wu et al.

(10) Patent No.: US 11,046,058 B2  
(45) Date of Patent: Jun. 29, 2021

(54) COMPOSITE MATERIAL

(71) Applicant: HEWLETT-PACKARD DEVELOPMENT COMPANY, L.P., Spring, TX (US)

(72) Inventors: Kuan-Ting Wu, Taipei (TW); Cheng-Feng Liao, Taipei (TW); Wei-Chung Chen, Taipei (TW); Chung-Hua Ku, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 511 days.

(21) Appl. No.: 15/746,868

(22) PCT Filed: Aug. 18, 2015

(86) PCT No.: PCT/CN2015/087341
§ 371 (c)(1),
(2) Date: Jan. 23, 2018

(87) PCT Pub. No.: WO2017/028199
PCT Pub. Date: Feb. 23, 2017

(65) Prior Publication Data
US 2020/0114626 A1    Apr. 16, 2020

(51) Int. Cl.
B32B 27/08    (2006.01)
B32B 27/36    (2006.01)
(Continued)

(52) U.S. Cl.
CPC .............. B32B 27/08 (2013.01); B32B 27/36 (2013.01); B32B 5/26 (2013.01); B32B 27/12 (2013.01);
(Continued)

(58) Field of Classification Search
CPC ............ B32B 27/08; B32B 27/36; B32B 5/26; B32B 27/12; B32B 27/308; B32B 27/34;
(Continued)

(56) References Cited

U.S. PATENT DOCUMENTS 5,798,439 A    8/1998    Lefebvre et al.
8,962,130 B2   2/2015    Kruckenberg et al.
(Continued)

FOREIGN PATENT DOCUMENTS

CN    1085156         4/1994
CN    101283414 A    10/2008
(Continued)

OTHER PUBLICATIONS

PubChem ("Zinc borate," PubChem, p. 1-66, https://pubchem.ncbi.nlm.nih.gov/compound/ZINC-borate, accessed Aug. 11, 2020. (Year: 2020).*

(Continued)

Primary Examiner — Gerard Higgins  
Assistant Examiner — Kevin C Ortman, Jr.  
(74) Attorney, Agent, or Firm — HPI Patent Department

(57) ABSTRACT

Examples of the present disclosure present a composite material. In an example, the composite material may comprise: a carbon fiber composite and a surface treatment layer. The carbon fiber composite may comprise a core layer having a first side and a second side opposite to the first side, and a first set of two carbon fiber layers disposed over at least a portion of the core layer respectively on the first side and the second side. Each of the first set of the two carbon fiber layers may comprise carbon fibers aligned in a first direction in a plane. The surface treatment layer may be disposed on the carbon fiber composite.

10 Claims, 4 Drawing Sheets

(51) Int. Cl.
   *B32B 5/26* (2006.01)
   *B32B 27/12* (2006.01)
   *B32B 27/30* (2006.01)
   *B32B 27/34* (2006.01)

(52) U.S. Cl.
   CPC ............ *B32B 27/308* (2013.01); *B32B 27/34* (2013.01); *B32B 2260/046* (2013.01); *B32B 2262/106* (2013.01); *B32B 2457/00* (2013.01)

(58) Field of Classification Search
   CPC ........ B32B 2260/046; B32B 2262/106; B32B 2457/00; B32B 2250/40; B32B 2262/101; B32B 5/024; B32B 5/12; B32B 9/005; B32B 9/047; B32B 15/14; B32B 15/18; B32B 15/20; B32B 27/286; B32B 27/288; B32B 27/302; B32B 27/365; B32B 2255/02; B32B 2255/26; B32B 2255/28; B32B 2264/105; B32B 2307/546; B32B 2307/72; B32B 2571/00; B32B 5/02; C09D 5/38
   USPC ..... 427/126.1, 209, 212, 215, 372.2, 402, 7; 428/304.4, 316.6, 317.9, 45, 411.1
   See application file for complete search history.

(56) References Cited

U.S. PATENT DOCUMENTS

| | | |
|---|---|---|
| 8,975,313 B2 | 3/2015 | Mulholland |
| 2002/0160187 A1 | 10/2002 | Craig |
| 2003/0008125 A1 | 1/2003 | Delanoy et al. |
| 2004/0052861 A1 | 3/2004 | Hatcher et al. |
| 2004/0071948 A1* | 4/2004 | Gallet ....................... B32B 5/08 428/297.4 |
| 2006/0167147 A1 | 7/2006 | Asgari |
| 2011/0300358 A1* | 12/2011 | Blohowiak ............. B32B 15/14 428/215 |
| 2014/0308869 A1 | 10/2014 | Seyboth et al. |

FOREIGN PATENT DOCUMENTS

| | | |
|---|---|---|
| CN | 101879799 | 11/2010 |
| CN | 102555323 | 7/2012 |
| CN | 102615757 | 8/2012 |
| CN | 102615882 | 8/2012 |
| CN | 202517778 U | 11/2012 |
| CN | 104575660 | 4/2015 |
| DE | 102014214402 | 3/2015 |
| EP | 0719635 | 7/1996 |
| JP | 3137615 B2 | 2/2001 |
| WO | WO-2014/126490 A1 | 8/2014 |
| WO | WO-2015119064 | 8/2015 |

OTHER PUBLICATIONS

Brandon Demar Richard, "Thermal Infrared Reflective Metal Oxide Sol-gel Coatings for Carbon Fiber Reinforced Composite Structures," Dissertation, University of South Florida, Jan. 2013, pp. 1-121.

Ginger Gardner, "Colored Carbon Fiber," May 21, 2015, pp. 1-4, Gardner Business Media, Inc.

Database WPI Week 281324 Thomson Scientific, London, GB; AN 2813-C11771 XP882789241.

* cited by examiner

COMPOSITE MATERIAL

BACKGROUND

Electronic devices are widely used in such as entertainment, communications and office productivity. Housings of electronic devices, particularly those of portable electronic devices, may be used for preventing the parts in the electronic devices from being damaged.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which components or procedures shown in the figures are not necessarily essential for implementing the present disclosure. In other instances, well-known methods, procedures and components have not been described in detail so as not to unnecessarily obscure the examples.

Figure 1:
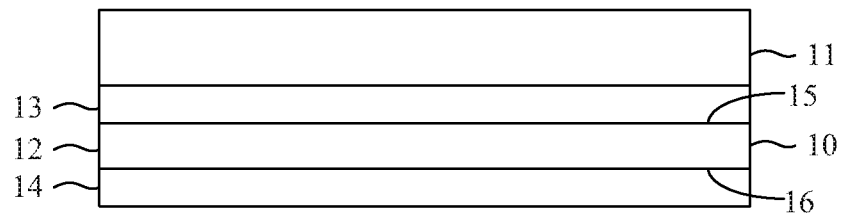
FIG. 1 is a schematic diagram illustrating the cross section of a composite material in accordance with an example of the present disclosure.

In order to prevent the parts in the electronic devices from being damaged when they encounter impact force, the housings of the electronic devices may have enough mechanical strength. Examples of the present disclosure may provide a composite material for making the housings of the electronic devices, thereby providing mechanical strengths for the housing of the electronic devices. FIG. 1 is a schematic diagram illustrating the cross section of a composite material in accordance with an example of the present disclosure.

In an example, the composite material may include: a carbon fiber composite 10 and a surface treatment layer 11. In an example, the surface treatment layer 11 is thermal curing under a preset temperature or UV curing coating to avoid the crimp of the carbon fiber composite. In an example, the preset temperature may be below 90° C. In an example, the UV curing coating may refer to a coating formed by applying the material, such as the thermoset ultraviolet resins, onto the carbon fiber composite, and then curing by ultraviolet irradiation. In an example, the surface treatment layer 11 may provide a metallic appearance to the composite material.

The carbon fiber composite 10 may include a core layer 12, and a first set of two carbon fiber layers 13, 14. The core layer 12 may have a first side 15 and a second 16 side opposite to the first side 15, and the first set of two carbon fiber layers 13, 14 disposed over at least a portion of the core layer 12 respectively on the first side 15 and the second side 16. Each of the first set of the two carbon fiber layers 13, 14 comprises carbon fibers aligned in a first direction in a plane. In an example, the surface treatment layer 11 may be disposed on either side of the carbon fiber composite.

In an example, the carbon fiber composite may further comprise a second set of two carbon fiber layers, disposed over at least a portion of the first set of two layers respectively on the first side and the second side, each layer of the second set comprising carbon fibers aligned in a second direction perpendicular to the first direction in the plane. The composite in the plane has a length and a width, the length larger than the width and parallel to the second direction.

In an example, the carbon fiber composite may further comprise a third set of two carbon fiber layers disposed between the carbon fiber layers of the first set and the second set respectively on the first side and the second side, each carbon fiber layer of the third set comprising carbon fibers aligned in the first direction.

Figure 2:
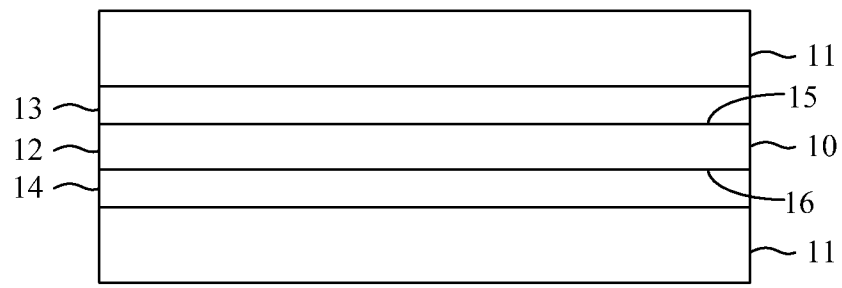
FIG. 2 is a schematic diagram illustrating the cross section of a composite material in accordance with an example of the present disclosure.

FIG. 2 is a schematic diagram illustrating the cross section of a composite material in accordance with an example of the present disclosure. Specifically, the surface treatment layer 11 may be disposed on two sides of the carbon fiber composite 10.

In an example, the carbon fibers may be any type of carbon fiber carbon atoms. The carbon fibers may comprise natural carbon fibers, synthetic carbon fibers, or both. For example, the carbon fibers may be selected from a group comprising polyacrylonitrile ("PAN"), rayon, pitch, and aramid carbon fibers. The carbon fibers may be commercially available carbon fibers. In one example, the carbon fibers comprise TORAYCA® T700S/T300 (from Toray Industries, Inc., Japan). In another example, the carbon fibers comprise Mitsubishi Rayon: PYROFIL® P330 series (from Mitsubishi Rayon Co., Ltd., Japan). In another example, the carbon fibers may be selected from a group comprising Tenax®-J HTS40 E13 3K 200tex, HTS40 E13 6K 400tex, and HTS40 E13 12K 800tex (from Toho Tenax America, Inc., TN, US).

In another example, the carbon fibers may be selected from a group comprising Tenax®-E HTS40 F13 12K 800tex and HTS40 F13 24K 1600tex (from Toho Tenax America, Inc., TN, US). The fibers may comprise continuous fibers. The fibers may have any suitable dimensions. In one example, the fibers have an average diameter of between about 5 μm and about 10 μm. Diameters of a larger or a smaller value are also possible. In one example, the fibers in a carbon fiber layer are continuous fibers and have the same length as the length of the carbon fiber layer and/or the composite. Shorter or longer fibers are also possible.

In an example, the core layer may be a thermoplastic core, a glass fiber core, a ceramic core, a metal core or a mixture thereof.

In an example, the thermoplastic of the core may be selected from a group comprising poly(methyl methacrylate) ("PMMA"), polycarbonate ("PC"), acrylonitrile butadiene styrene ("ABS"), poly (p-phenylene sulfide) ("PPS"), polyether ether ketone ("PEEK"), polyethersulfone ("PES"), polyamide and a mixture thereof.

In an example, the metal of the core may be selected from a group comprising silver, aluminum, copper, titanium, brass, bronze, stainless, nickel, chromium, zinc, tin, gold, tungsten, platinum, and a mixture thereof.

Figure 3:
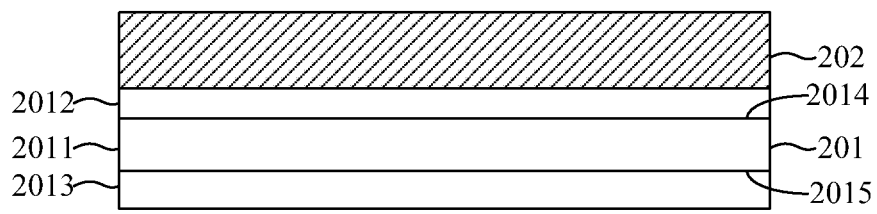
FIG. 3 is a schematic diagram illustrating the cross section of a composite material having a metallic ultraviolet (UV) coating in accordance with an example of the present disclosure.

FIG. 3 is a schematic diagram illustrating the cross section of a composite material having a metallic ultraviolet (UV) coating in accordance with an example of the present disclosure. Specifically, the composite material may comprise: a carbon fiber composite 201 comprising a core layer 2011 having a first side 2014 and a second side 2015 opposite to the first side 2014, and a first set of two carbon fiber layers 2012, 2013 disposed over at least a portion of the core layer 2011 respectively on the first side 2014 and the second side 2015, wherein each of the first set of the two carbon fiber layers 2012, 2013 comprises carbon fibers aligned in a first direction in a plane; and a metallic ultraviolet coating 202 disposed on the carbon fiber composite 201.

In an example, the metallic ultraviolet coating may comprise thermoset ultraviolet resins, thermoplastic resins and powders. In an example, the metallic ultraviolet coating may comprise thermoset ultraviolet resins and powders. In an example, the metallic ultraviolet coating may comprise thermoplastic resins and powders.

In an example, the thermoset ultraviolet resins may be selected from a group comprising polyols, polycarboxylic acids, polyamines, polyamides, acetoacetate, and a mixture thereof. The thermoplastic resins may be selected from a group comprising cyclic olefin copolymer, polymethylmethacrylate, polycarbonate, polyethylene, polypropylene, urethane acrylates, polystyrene, polyetheretherketone, polyesters, polyethylene terephthalate, polyvinyl chloride, polyvinylidene chloride, nylon, polysulfone, parylene, fluoropolymers, and a mixture thereof; based on 100 parts by weight of the metallic ultraviolet coating, no more than 30 parts by weight of the thermoplastic resins are included therein. The powders may be selected from a group comprising silver, aluminum, copper, titanium, brass, bronze, stainless, nickel, chromium, zinc, pearl, tin, gold, tungsten, platinum, and a mixture thereof; based on 100 parts by weight of the metallic ultraviolet coating, no more than 30 parts by weight of the powders are included therein. Accordingly, the composite material may be used as a housing of an electronic device, to present a metallic surface for the housing.

In an example, the metallic ultraviolet coating may a thickness of more than or equal to 5 μm to less than or equal to 30 μm.

Figure 4:
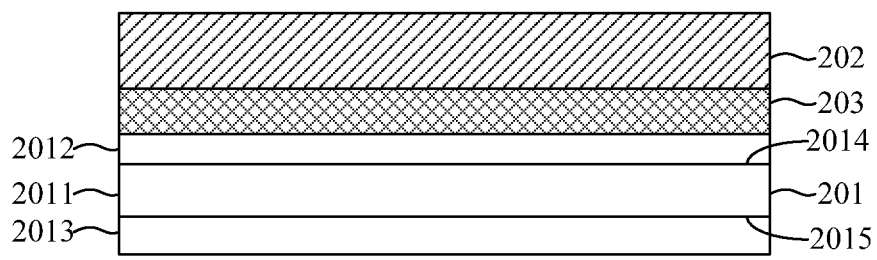
FIG. 4 is a schematic diagram illustrating the cross section of a composite material having a metallic UV coating in accordance with an example of the present disclosure.

FIG. 4 is a schematic diagram illustrating the cross section of a composite material having a metallic ultraviolet (UV) coating in accordance with an example of the present disclosure. Specifically, the composite material may comprise: a carbon fiber composite 201 comprising a core layer 2011 having a first side 2014 and a second side 2015 opposite to the first side 2014, and a first set of two carbon fiber layers 2012, 2013 disposed over at least a portion of the core layer 2011 respectively on the first side 2014 and the second side 2015, wherein each of the first set of the two carbon fiber layers 2012, 2013 comprises carbon fibers aligned in a first direction in a plane; a primer coating 203 disposed on the carbon fiber composite 201, and a metallic ultraviolet coating 202 disposed on the primer coating 203. The primer coating 203 is the first application of paint or a paint product to a surface. The main function of the primer coating is to ensure that any successive layers of paint adhere to the surface properly. In other word, the primer coating 203 is to enhance the bonding between the carbon fiber composite 201 and the metallic ultraviolet coating 202 on the primer coating 203.

In an example, the primer coating 203 may be selected from a group comprising a (meth)acrylic copolymer, epoxy and polyurethane polymers. The (meth)acrylic copolymer may be a copolymer of a monomer mixture which includes a (meth)acrylate having a C1 to C20 alkyl group, a (meth)acrylate having an alicyclic group, a monomer having a hydroxy group, and a monomer having at least two aromatic groups. The monomer mixture may further include a monomer having a carboxylic acid group. The (meth)acrylate having a $C_1$ to $C_{20}$ alkyl group may include a (meth)acrylic acid ester having a linear or branched $C_1$ to $C_{20}$ alkyl group. For example, the (meth)acrylate having a $C_1$ to $C_{20}$ alkyl group may be selected from a group comprising methyl (meth)acrylate, ethyl (meth)acrylate, propyl (meth)acrylate, butyl (meth)acrylate, pentyl (meth)acrylate, hexyl (meth)acrylate, ethylhexyl(meth)acrylate, heptyl(meth)acrylate, octyl (meth)acrylate, nonyl (meth)acrylate, decyl(meth) acrylate, undecyl(meth)acrylate, and dodecyl (meth)acrylate, without being limited thereto. The (meth)acrylate having a $C_1$ to $C_{20}$ alkyl group may be used alone or in combination thereof.

In an example, the metallic ultraviolet coating may have a thickness of more than or equal to 5 μm to less than or equal to 30 μm, and the primer coating may have a thickness of more than or equal to 3 μm to less than or equal to 15 μm.

Figure 5:
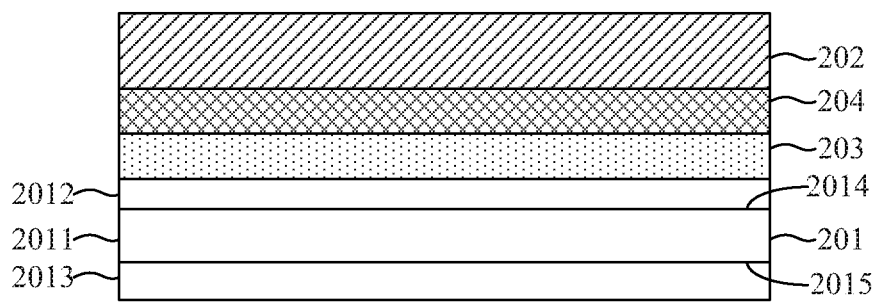
FIG. 5 is a schematic diagram illustrating the cross section of a composite material having a metallic UV coating in accordance with an example of the present disclosure.

FIG. 5 is a schematic diagram illustrating the cross section of a composite material having a metallic UV coating in accordance with an example of the present disclosure. Specifically, the composite material may comprise: a carbon fiber composite 201 comprising a core layer 2011 having a first side 2014 and a second side 2015 opposite to the first side 2014, and a first set of two carbon fiber layers 2012, 2013 disposed over at least a portion of the core layer 2011 respectively on the first side 2014 and the second side 2015, wherein each of the first set of the two carbon fiber layers 2012, 2013 comprises carbon fibers aligned in a first direction in a plane; a base coating 204 disposed on the carbon fiber composite 201, a primer coating 203 disposed on the base coating 204, and a metallic ultraviolet coating 202 disposed on the primer coating 203.

In an example, the base coating is to contribute the color performance. In an example, the base coating may comprise a thermoplastic resin and a pigment. In an example, the base coating may comprise a thermoset resin and a pigment. In an example, the base coating may comprise a thermoplastic resin, a thermoset resin and a pigment In an example, the metallic ultraviolet coating may have a thickness of more than or equal to 5 µm to less than or equal to 30 µm, the primer coating may have a thickness of more than or equal to 3 µm to less than or equal to 15 µm, and the base coating may have a thickness of more than or equal to 3 µm to less than or equal to 15 µm.

Figure 6:
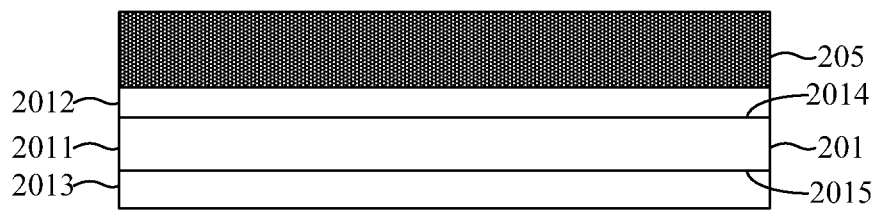
FIG. 6 is a schematic diagram illustrating the cross section of a composite material having a metallic luster hybrid coating in accordance with an example of the present disclosure.

FIG. 6 is a schematic diagram illustrating the cross section of a composite material having a metallic luster hybrid coating in accordance with an example of the present disclosure. Specifically, the composite material may comprise: a carbon fiber composite 201 comprising a core layer 2011 having a first side 2014 and a second side 2015 opposite to the first side 2014, and a first set of two carbon fiber layers 2012, 2013 disposed over at least a portion of the core layer 2011 respectively on the first side 2014 and the second side 2015, wherein each of the first set of the two carbon fiber layers 2012, 2013 comprises carbon fibers aligned in a first direction in a plane; and a metallic luster hybrid coating 205 disposed on the carbon fiber composite 201.

In an example, the metallic luster hybrid coating may comprise sol-gel precursors, a material with thermal resistance selected from a group consisting of thermoset resins and thermoplastic resins, and powders. Specifically, the sol-gel, precursors may be selected from a group consisting of tetraethylorthosilicate, glycidoxypropyltriethoxysilane, 3-aminopropyltriethoxysilane, methacryloxypropyltrimethoxysilane, vinyltrimethylsiloxane, diphenyldimethoxysilane, zirconiumisopropoxide, metal alkoxides, and a mixture thereof; the material with thermal resistance may be selected from a group consisting of polyacrylate, celluloid, polyethylene, polypropylene, polyvinyl chloride, chlorinated polyvinyl chloride, polystyrene, epoxy, acrylonitrile butadiene styrene, polycarbonate, polyurethane, polybutylene, poly vinylidene fluoride, fluoro-polymers, nylon, polytetrafluoroethylene, polytetrafluoroetylene, polyacetylenes, polypyrrol, polythiophene, polyfuran, poly(p-poly)dialkylfluorene, and a mixture thereof; and the powders may be selected from a group of silver, aluminum, copper, titanium, brass, bronze, stainless, nickel, chromium, zinc, pearl, tin, gold, tungsten, platinum, metal alloys, and a mixture thereof.

In an example, based on 100 parts by weight of the metallic luster hybrid coating, no more than 30 parts by weight of the powders are included therein, and no more than 30 parts by weight of the material with thermal resistance are included therein.

In an example, the metallic luster hybrid coating may have a thickness of more than or equal to 5 µm to less than or equal to 30 µm.

Figure 7:
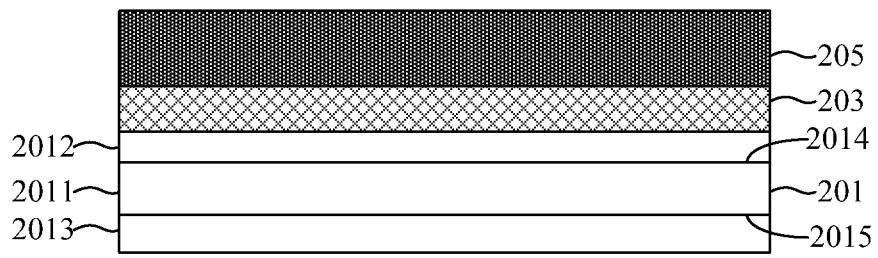
FIG. 7 is a schematic diagram illustrating the cross section of a composite material having a metallic luster hybrid coating in accordance with an example of the present disclosure.

FIG. 7 is a schematic diagram illustrating the cross section of a composite material having a metallic luster hybrid coating in accordance with an example of the present disclosure. Specifically, the composite material may comprise: a carbon fiber composite 201 comprising a core layer 2011 having a first side 2014 and a second side 2015 opposite to the first side 2014, and a first set of two carbon fiber layers 2012, 2013 disposed over at least a portion of the core layer 2011 respectively on the first side 2014 and the second side 2015, wherein each of the first set of the two carbon fiber layers 2012, 2013 comprises carbon fibers aligned in a first direction in a plane; a primer coating 203 disposed on the carbon fiber composite 201; and a metallic luster hybrid coating 205 disposed on the primer coating 203.

In an example, the primer coating 203 may be selected from a group comprising a (meth)acrylic copolymer, epoxy and polyurethane polymers. The (meth)acrylic copolymer may be a copolymer of a monomer mixture which includes a (meth)acrylate having a C1 to C20 alkyl group, a (meth)acrylate having an alicyclic group, a monomer having a hydroxy group, and a monomer having at least two aromatic groups. The monomer mixture may further include a monomer having a carboxylic acid group. The (meth)acrylate having a $C_1$ to $C_{20}$ alkyl group may include a (meth)acrylic acid ester having a linear or branched $C_1$ to $C_{20}$ alkyl group. For example, the (meth)acrylate having a $C_1$ to $C_{20}$ alkyl group may be selected from a group comprising methyl (meth)acrylate, ethyl (meth)acrylate, propyl (meth)acrylate, butyl (meth)acrylate, pentyl (meth)acrylate, hexyl (meth)acrylate, ethylhexyl(meth)acrylate, heptyl(meth)acrylate, octyl (meth)acrylate, nonyl (meth)acrylate, decyl(meth)acrylate, undecyl(meth)acrylate, and dodecyl (meth)acrylate, without being limited thereto. The (meth)acrylate having a $C_1$ to $C_{20}$ alkyl group may be used alone or in combination thereof.

In an example, the metallic luster hybrid coating may have a thickness of more than or equal to 5 µm to less than or equal to 30 µm, and the primer coating may have a thickness of more than or equal to 3 µm to less than or equal to 15 µm.

Figure 8:
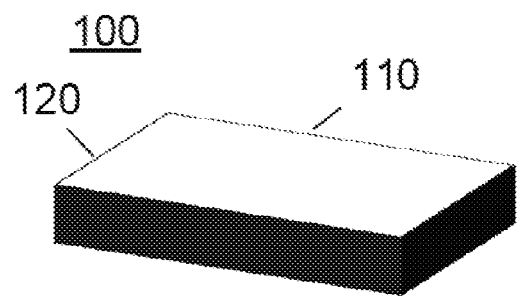
FIG. 8 is a schematic of an aerial view of a carbon fiber composite in accordance with one example of the present disclosure.

The aforedescribed core layer and carbon fiber layers(s) may be assembled in any combination to form a carbon fiber composite. FIG. 8 is a schematic of an aerial view of a carbon fiber composite in accordance with one example of the present disclosure, having a length 110 and width 120 in a plane (as defined by length 110 and width 120), with the length 110 being larger in dimension than the width 120. The terms "length" and "width" collectively are employed herein to denote two different dimensions of a plane of the composite, with one dimension (i.e., length 110) being larger than the other (i.e., width 120).

Figure 9:
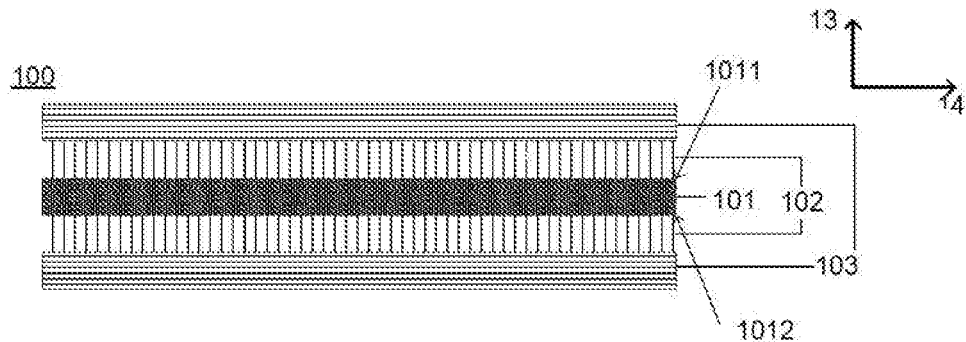
FIG. 9 is a schematic diagram illustrating the cross section of a carbon fiber composite in accordance with an example of the present disclosure.

In an example, FIG. 9 is a schematic diagram illustrating the cross section of a carbon fiber composite in accordance with an example of the present disclosure. The composite comprises a core layer 101; a first set of two layers 102 disposed over at least a portion of the core layer on the first side 1011 and the second side 1012; and a second set of two layers 103 disposed over at least a portion of the first set of two layers 101 respectively on the first side and the second side. The core layer 101 may be any of the core layers described herein, comprising any of the materials described herein as suitable for the core layer.

Each of the carbon fiber layers of the carbon fiber composite, including those of the first set 102 and those of the second set 103, may be any of the carbon fiber layers described herein, comprising any of the materials described herein as suitable for the carbon fiber layers. The fibers of the first set may be aligned in a first direction 13 (see FIG. 9), and those of the second set may be aligned in a second direction 14, which is perpendicular to the first direction 13 in the plane as defined by 13 and 14 (see FIG. 9). The plane as defined by the length 110 and width 120 (as shown in FIG. 8) may be parallel to that as defined by directions 13 and 14. It is noted that parallel planes herein are considered the same plane. The direction 14 may be parallel to the length 110 (i.e., the larger dimension) of the composite.

Figure 10:
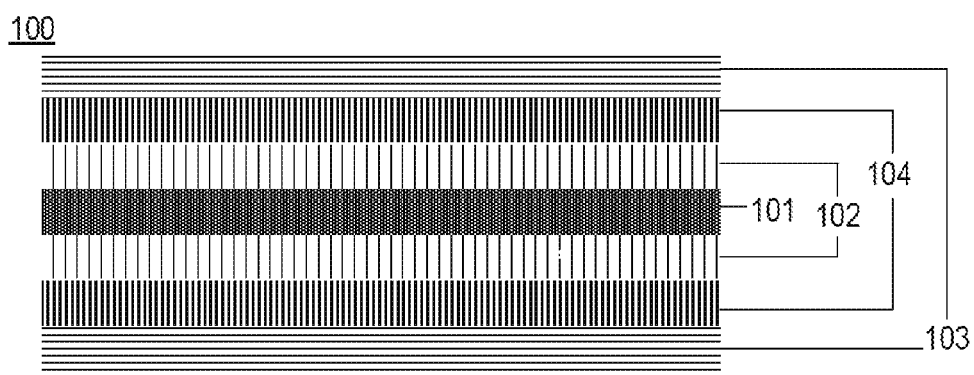
FIG. 10 is a schematic diagram illustrating the cross section of a carbon fiber composite in accordance with an example of the present disclosure.

In an example, the composite described herein may comprise more than two additional layers comprising fibers. FIG. 10 is a schematic diagram illustrating the cross section of a carbon fiber composite in accordance with an example of the present disclosure. For example, the composite may comprise a third set of two layers 104 disposed between the layers of the first set 102 and the second set 103 respectively on the first side 1011 and the second side 1012. See FIG. 10. Each layer of the third set 104 may comprise fibers that are aligned in a specific direction. In one example, this specific direction is the first direction 13. It is noted that more than one additional (set) of layer(s) may be employed. It is also noted that the terms "first," "second," "third," etc. herein are merely used to connote that the objects they respectively describe are different entities and are not meant to describe any chronological order, unless explicitly specified.

Each of the layers of the composite described herein may have any suitable thickness. In one example, these layers have the same thickness. In another example, these layers have different thickness. For example, the core layer may be thicker than the carbon fiber layers. The core layer may be thinner than the carbon fiber layers. In one example, all of the carbon fiber layers have the same thickness, and this thickness is different from that of the core layer. In another example, at least some of the carbon fiber layers have different thickness. In one example, the carbon fiber layers in each set of the two layers have the same thickness. In another example, the carbon fiber layers in each set of the two layers have different thickness.

The overall carbon fiber composite described herein may have any suitable thickness, depending on the application. For example, the composite may have a thickness in the millimeter range. In one example, the carbon fiber composite described herein has a thickness of less than or equal to about 2.5 mm—e.g., less than or equal to about 2.0 mm, about 1.5 mm, about 1.2 mm, about 1.0 mm, about 0.8 mm, about 0.6 mm, or smaller. In another example, the thickness of the carbon fiber composite is greater than or equal to about 2.5 mm. Within the composite, each layer may have any suitable thickness. In one example, the core layer has a thickness that is twice as much as each of the carbon fiber layers. In one example, the core layer has a thickness of about 0.2 mm, whereas each of the carbon fiber layers has a thickness of about 0.1 mm. Other thickness values for the core layer and the carbon fiber layers are also possible.

Any of the carbon fiber layers described herein may comprise fibers embedded within a polymeric matrix, as described above. The polymeric matrix may comprise any suitable material, such as those described herein. For example, the fibers in the first set may be embedded in a first thermoplastic polymeric matrix; and the fibers in the second set may be embedded in a second thermoplastic polymeric matrix. In one example, the different carbon fiber layers comprise different polymeric materials as the matrix material from one another—in the foregoing instance, the first thermoplastic polymeric matrix and the second thermoplastic polymeric matrix comprise different thermoplastic materials. In another example, the different carbon fiber layers comprise the same polymeric materials as the matrix material. In another example, some of the carbon fiber layers comprise the same polymeric materials as the matrix as some others, while the others comprise different polymeric materials.

Depending on the materials involved and the arrangement thereof, the carbon fiber composite described herein may have any suitable mechanical properties. For example, the composite described herein may have a high flexural strength in comparison to a metal or a metal alloy of comparable, or the same, size. The flexural strength of a material herein may be reflected in the flexural modulus (also often known as "bending modulus") of the material. The flexural modulus of a material may be obtained by ASTM D790 using a 3-point test on the material in the form of a rectangular beam and may be expressed by $Eflex=L3F/(4wh3d)$; where Eflex is flexural modulus, w and h the width and thickness of the beam, L the distance between the two outer supports, and d the deflection due to the load F applied at the middle of the beam.

In one example of a composite comprising a core layer comprising PC and a first set and a second set of carbon fiber layers (as shown in FIG. 9), wherein the core layer has a thickness of 0.2 mm, and each of the carbon fiber layers in the first set 102 and second set 103 has a thickness of 0.1 mm, the composite (having a total thickness of about 0.8 mm) has a flexural modulus of at least about 35 GPa—at least about 40 GPa, about 45 GPa, about 50 Pa, about 55 GPa, about 60 GPa, about 65 GPa, about 70 GPa, about 80 GPa or higher. It is noted that the fibers in these first and second sets are unidirectional fibers. Depending on the materials and geometry involved, higher or lower flexural modulus values are also possible.

The carbon fiber composite described herein may have several additional desirable properties. Depending on the materials used, the carbon fiber composite described herein may be recyclable, particularly for a composite comprising a thermoplastic core and carbon fibers. Moreover, in one example, because the flexural modulus of the carbon fiber composites arises mainly from the unidirectional fibers, the composites described herein are less expensive than a composite otherwise comprising woven fibers. It is noted that unidirectional fibers generally are less expensive than woven fibers, particularly in the case of carbon fibers.

Additionally, while the carbon fiber composite described herein may provide the same, or comparable, mechanical properties (e.g., flexural modulus) as a metal-containing composite, the carbon fiber composite described herein may be lighter than the metal-containing composite. For example, the carbon fiber composites described herein may have a density that is between about 1.2 g/cm3 and about 1.7 g/cm3—e.g., between about 1.3 g/cm3 and about 1.6 g/cm3, between about 1.4 g/cm3 and about 1.5 g/cm3, etc. Other values are also possible. In one example, the density is between about 1.3 g/cm3 and about 1.4 g/cm3.

In an example, the carbon fibers in the first set and the second set comprise continuous fibers. The carbon fibers in the first set and the second set may be selected from a group comprising polyacrylonitrile ("PAN"), rayon, pitch, and aramid carbon fibers.

Figure 11:
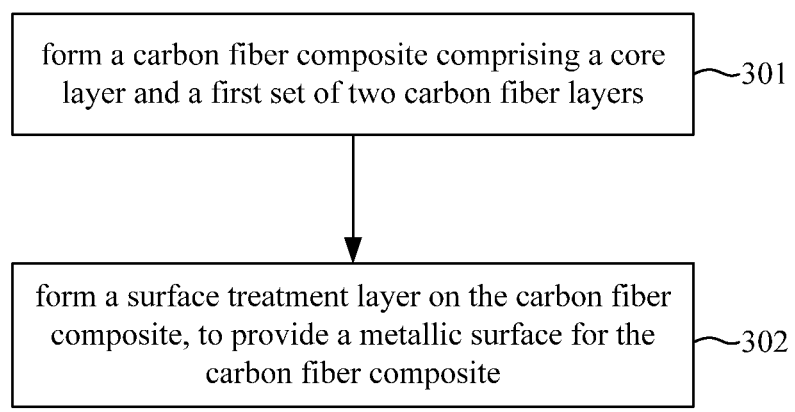
FIG. 11 is a flow diagram illustrating an example of the manufacturing method.

FIG. 11 is a flow diagram illustrating an example of the manufacturing method. In an example, the method of manufacturing a composite material may include the following procedures. At block 301, a carbon fiber composite may be formed by a core layer and a first set of two carbon fiber layers; wherein the core layer has a first side and a second side opposite to the first side, and the first set of the two carbon fiber layers are disposed over at least a portion of the core layer respectively on the first side and the second side, each of the first set of the two carbon fiber layers comprises carbon fibers aligned in a first direction in a plane; and at block 302; forming a surface treatment layer on the carbon fiber composite, to provide a metallic surface for the carbon fiber composite.

In an example, forming the surface treatment layer on the carbon fiber composite comprises: adopting a spray coating process or a dipping coating process to generate a metallic ultraviolet coating or a metallic luster hybrid coating for the carbon fiber composite.

In an example, a method of making a carbon fiber composite is provided, comprising: disposing a first set of two layers over at least a portion of a core layer respectively on a first side and a second side thereof, wherein the core layer comprises a thermoplastic, the first side is opposite to the second side, and each layer of the first set comprises carbon fibers aligned in a first direction in a plane; and disposing a second set of two layers over at least a portion of the first set of two layers respectively on the first side and the second side, each layer of the second set comprising carbon fibers aligned in a second direction perpendicular to the first direction in the plane, wherein the core layer and each layer of the first set and the second set each has a length and a width in the plane, the length larger than the width and parallel to the second direction; and thermal forming the layers of the first set and the second set and the core layer into a composite.

The fibers may be embedded within (e.g., pre-impregnated by) a polymeric matrix. The polymeric matrix may comprise any suitable polymer, such as a polymer resin. In one example, the polymeric matrix comprises a thermoplastic. The polymer in the polymeric matrix may be the same as or different from that of the polymeric core layer. The polymer in the polymeric matrix may comprise any of the aforementioned polymers suitable for the core layer. For example, the polymer in the polymeric matrix may be selected from a group comprising poly(methyl methacrylate) ("PMMA"), polycarbonate ("PC"), acrylonitrile butadiene styrene ("ABS"), poly (p-phenylene sulfide) ("PPS"), polyether ether ketone ("PEEK"), polyethersulfone ("PES"), and polyamide.

The fibers in a layer containing both fibers and a polymeric matrix may be present at any suitable content value. For example, the fibers may be between about 30 wt % and about 80 wt % (balanced by the matrix) in a carbon fiber layer—e.g., between about 35 wt % and about 75 wt %, between about 40 wt % and about 70 wt %, between about 45 wt % and about 65 wt %, between about 50 wt % and about 60 wt %, etc. Other content values are also possible.

The fibers in the carbon fiber layer may be arranged in any orientation (or direction). For example, the fibers may be aligned in one direction. As a result, the carbon fiber layer having the aligned fibers may exhibit anisotropic material properties. For example, the anisotropic carbon fiber layer may exhibit stronger mechanical properties (e.g., elastic modulus, flexural modulus, etc.) along the aligned direction than the one orthogonal thereto in the same plane. A layer containing fibers aligned in one direction may refer to a layer having at least about 80 vol % of the fibers aligned in that direction—e.g., at least about 85 vol %, about 90 vol %, about 95 vol %, about 99 vol %, about 99.5 vol %, about 99.9 vol %, or higher. Other vol % values are also possible.

In an example, the fibers may be woven fibers. The woven fibers may be selected from a group comprising the following forms: plain, twill, satin, triaxial, stitched, basket, continuous strand mat, and veil. For example, the carbon fibers may be fed into a weaving machine to make woven fibers. In one example, a woven carbon fiber layer exhibits isotropic material properties, at least with respect to the plane as defined by the layer. In other words, the isotropic carbon fiber layer may exhibit the same, or about the same, mechanical properties in all directions of the layer (in the plane).

Figure 12:
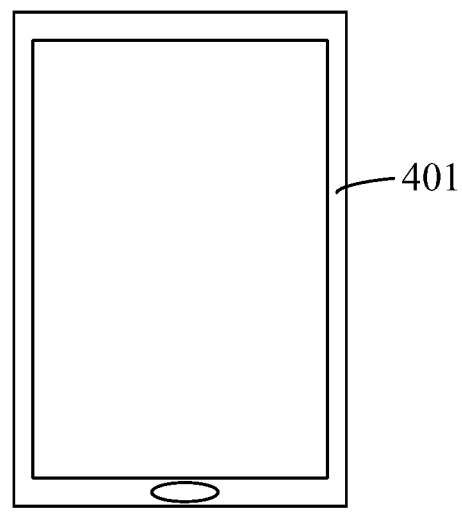
FIG. 12 is schematic views showing the housing 401 of a smart phone, wherein the composite material provided by an example of the present disclosure may be used for the housing of a smart phone.

FIG. 12 is schematic views showing the housing 401 of a smart phone, wherein the composite material provided by an example of the present disclosure may be used for the housing of a smart phone.

In an example, the housing may comprise a composite material comprising: a carbon fiber composite comprising a carbon fiber composite comprising a core layer having a first side and a second side opposite to the first side, and two unidirectional carbon fiber layers disposed over at least a portion of the core layer respectively on the first side and the second side, wherein each of the two unidirectional carbon fiber layers comprises carbon fibers aligned in a first direction in a plane; and a surface treatment layer disposed on the carbon fiber composite. The surface treatment layer is a metallic ultraviolet coating or a metallic luster hybrid coating.

In an example, a housing of a device may refer to any structural component that encloses the interior of the device. In one example, the composite described herein is a part of the housing of an electronic device. For example, the composite may be any part of the housing, including back cover, front cover, side cover, and the like, of the device.

An electronic device herein may refer to any device comprising one electrical circuit. Thus, in one example, the housing that comprises the composite material described herein may be external to the electrical circuit. The electronic device may be a consumer electronic device. An electronic device may refer to portable/mobile electronic device. An electronic device here may refer to a computer, a memory storage, a display, a signal transmitting device, and the like. A computer may refer to a desktop, a laptop, a tablet, a phablet, a tablone, and the like. A storage unit may refer to the hardware of a hard drive, a server, a processor, and the like. A display may refer to a monitor, a liquid crystal display ("LCD"), a television, and the like. A signal transmitting device may refer to a device transmitting any type of signal, including light, sound, heat, and the like. In one example, the electronic device is a mobile phone.

The composite material comprising a carbon fiber composite and a surface treatment layer can provide excellent metallic appearance and high mechanical strength. In addition, this composite material may be suitable for thermal curing or UV curing coating. The arbon fiber composite comprising a core sandwiched between unidirectional fibers has a large yield strength, relative to a metal (e.g., aluminum) or metal alloy of comparable, or the same size. A material having a large yield strength may be considered as a material having a high elasticity. Thus, by using the carbon fiber composite and unidirectional fibers as the fibers in this composite, one may achieve both high elasticity and high flexural modulus. Such mechanical properties may be desirable particularly for a housing structural component, which is frequently subject to mechanical deformation (e.g., contact with another (often hard) object).

The foregoing description, for the purposes of explanation, has been described with the reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications which are suited to the particular use contemplated.

What is claimed is:

1. A composite material, comprising:
   a carbon fiber composite comprising a core layer having a first side and a second side opposite to the first side, and a first set of two carbon fiber layers disposed over at least a portion of the core layer respectively on the first side and the second side, wherein each of the first set of the two carbon fiber layers comprises carbon fibers aligned in a first direction in a plane; and
   a surface treatment layer, disposed on the carbon fiber composite, wherein the surface treatment layer is a metallic luster hybrid coating including a sol-gel precursor, a metal powder, and a material with thermal resistance.

2. The composite material according to claim 1, wherein the material with thermal resistance is selected from a group consisting of a thermoset resins and a thermoplastic resin;
   wherein the sol-gel precursor is selected from a group comprising consisting of tetraethylorthosilicate, glycidoxypropyltriethoxysilane, 3-aminopropyltriethoxysilane, methacryloxypropyltrimethoxysilane, vinyltrimethylsiloxane, diphenyldimethoxysilane, zirconiumisopropoxide, metal alkoxides, and a mixture thereof;
   wherein the thermoset resin and thermoplastic resin are selected from a group consisting of polyacrylate, celluloid, polyethylene, polypropylene, polyvinyl chloride, chlorinated polyvinyl chloride, polystyrene, epoxy, acrylonitrile butadiene styrene, polycarbonate, polyurethane, polybutylene, poly vinylidene fluoride, fluoro-polymers, nylon, polytetrafluoroethylene, polyacetylenes, polypyrrol, polythiophene, polyfuran, poly (p-poly)dialkylfluorene, and a mixture thereof, and
   wherein the powder is selected from the group consisting of silver, aluminum, copper, titanium, brass, bronze, stainless, nickel, chromium, zinc, pearl, tin, gold, tungsten, platinum, metal alloys, and a mixture thereof.

3. The composite material according to claim 1, further comprising:
   a primer layer disposed between the metallic luster hybrid coating and the carbon fiber composite.

4. The composite material according to claim 1, wherein the carbon fiber composite further comprises:
   a second set of two carbon fiber layers, disposed over at least a portion of the first set of two layers respectively on the first side and the second side, each carbon fiber layer of the second set comprising carbon fibers aligned in a second direction perpendicular to the first direction in the plane; and
   wherein the carbon fiber composite in the plane has a length and a width, and the length is larger than the width and parallel to the second direction.

5. The composite material according to claim 4, wherein the carbon fiber composite further comprises:
   a third set of two carbon fiber layers disposed between the carbon fiber layers of the first set and the second set respectively on the first side and the second side, each carbon fiber layer of the third set comprising carbon fibers aligned in the first direction.

6. A method of manufacturing the composite material of claim 1, comprising:
   forming the carbon fiber composite comprising the core layer and the first set of two carbon fiber layers; wherein the core layer has the first side and the second side opposite to the first side, and the first set of the two carbon fiber layers are disposed over at least a portion of the core layer respectively on the first side and the second side, each of the first set of the two carbon fiber layers comprises carbon fibers aligned in the first direction in a plane; and
   forming the surface treatment layer in the form of the metallic luster hybrid coating on the carbon fiber composite, to provide a metallic surface for the carbon fiber composite.

7. The composite material according to claim 1, further comprising:
   a primer coating and a base coating, sequentially disposed between the metallic luster hybrid coating and the carbon fiber composite.

8. The method according to claim 6, wherein forming the surface treatment layer on the carbon fiber composite comprises: adopting a spray coating process or a dipping coating process to generate the metallic luster hybrid coating for the carbon fiber composite.

9. A housing of an electronic device, comprising:
   a composite material comprising:
   a carbon fiber composite comprising a core layer having a first side and a second side opposite to the first side, and two unidirectional carbon fiber layers disposed over at least a portion of the core layer respectively on the first side and the second side, wherein each of the two unidirectional carbon fiber layers comprises carbon fibers aligned in a first direction in a plane; and
   a surface treatment layer disposed on the carbon fiber composite, wherein the surface treatment layer is a metallic luster hybrid coating including a sol-gel precursor, a metal powder, and a material with thermal resistance.

10. The housing according to claim 9, wherein the electronic device is a portable or mobile electronic device.

* * * * *